US006602821B2

(12) United States Patent
Petit-Clair et al.

(10) Patent No.: US 6,602,821 B2
(45) Date of Patent: Aug. 5, 2003

(54) SUPPORTED CATALYSTS TO BE USED IN CONVERSION REACTIONS FOR ORGANIC COMPOUNDS

(75) Inventors: Carine Petit-Clair, Montesson (FR); Blaise Didillon, Rueil Malmaison (FR); Denis Uzio, Marly le Roi (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 124 days.

(21) Appl. No.: 09/780,610

(22) Filed: Feb. 12, 2001

(65) Prior Publication Data

US 2002/0028744 A1 Mar. 7, 2002

Related U.S. Application Data

(63) Continuation-in-part of application No. 09/726,031, filed on Nov. 30, 2000, now Pat. No. 6,482,997, which is a continuation of application No. 09/373,228, filed on Aug. 12, 1999, now abandoned.

(30) Foreign Application Priority Data

Aug. 12, 1998 (FR) .............................. 98 10347

(51) Int. Cl.[7] .............................. B01J 23/58; B01J 23/78
(52) U.S. Cl. ...................... 502/306; 502/305; 502/317; 502/321; 502/325; 502/328; 502/330; 502/337; 502/338; 502/339
(58) Field of Search ................. 502/305, 306, 502/317, 321, 325, 328, 330, 337, 338, 339

(56) References Cited

U.S. PATENT DOCUMENTS

| 4,136,059 A | 1/1979 | Jalan et al. |
|---|---|---|
| 4,425,261 A | 1/1984 | Stenius et al. |
| 4,588,705 A | 5/1986 | Vanderspurt et al. |
| 4,590,177 A | 5/1986 | Richard et al. |
| 4,714,693 A | 12/1987 | Targos |
| 4,740,490 A | 4/1988 | Vanderspurt et al. |
| 4,764,499 A | 8/1988 | Vanderspurt et al. |
| 5,008,234 A | 4/1991 | Ozin et al. |
| 5,275,998 A | 1/1994 | Tsurumi et al. |
| 5,302,622 A | 4/1994 | Chaumette et al. |
| 5,733,839 A | 3/1998 | Espinoza et al. |
| 6,214,229 B1 | 4/2001 | Robertson |
| 6,482,997 B2 * | 11/2002 | Petit-Clair et al. .......... 585/250 |

FOREIGN PATENT DOCUMENTS

| EP | 0 002 651 | 6/1979 |
|---|---|---|
| EP | 0 171 296 | 2/1986 |
| EP | 0 581 619 | 2/1994 |
| EP | 0 736 326 | 10/1996 |

* cited by examiner

Primary Examiner—Tom Dunn
Assistant Examiner—Christina Ildebrando
(74) Attorney, Agent, or Firm—Millen White Zelano & Branigan, P.C.

(57) ABSTRACT

The present invention relates to a catalyst which can be used in a process involving a conversion reaction for organic compounds, containing at least one support and at least one metal, and characterized in that it has particles of an average size greater than approximately 1 nm, and more than 80% of particles, the size of which is comprised in the range $D\pm(D.0.2)$ where D represents the average size of the particles. It also relates to the process for preparing this catalyst which consists of preparing a colloidal suspension, in aqueous phase, of the metal oxide or metals to be supported, then depositing this suspension on a support, and optionally reducing the oxide thus supported.

15 Claims, No Drawings

SUPPORTED CATALYSTS TO BE USED IN CONVERSION REACTIONS FOR ORGANIC COMPOUNDS

This application is a continuation-in-part of U.S. application Ser. No. 09/726,031, filed Nov. 30, 2000, now U.S. Pat. No. 6,482,997, which in turn is a continuation of U.S. application Ser. No. 09/373,228, filed Aug. 12, 1999 now abandoned.

The present invention relates to supported matallic catalysts containing at least one metal, at least one support and optionally an alkali or alkaline-earth metal, which has particles of an average size greater than approximately 1 nm, and more than 80% of particles, the size of which is comprised in the range D±(D0.2) where D represents the average size of the particles.

It also relates to the process for preparing these catalysts and their use in conversion reactions for organic compounds.

DESCRIPTION OF THE RELATED ART

The properties of supported matallic catalysts, i.e. catalysts constituted by a metal or by several metals, deposited on a support chosen from refractory oxides, carbon, polymers or any other material, are conditional on a set of parameters highly dependent on the preparation method and treatment conditions chosen to obtain the finished catalyst.

With regard to the supported matallic catalysts, there are a large number of examples in the literature showing the influence of the size of matallic crystallites on the activity of the final catalyst. This aspect has been described in extensive detail in Catalysis by Metals and Alloys, V. Ponec, E. Bound, Study in Surface Science and Catalysis, Volume 95, page 280, 1995.

The reactions included within the scope, i.e. for which the activity of the matallic atoms situated on the surface of the particles is dependent on the size of these particles, are called structure-sensitive.

Among the reactions in which the catalyst according to the invention can be used, for example, hydrogenation reactions of compounds having acetylenic, dienic, olefinic, aromatic, ketone, aldehyde, acid or nitro functions, the hydrogenation of carbon monoxide into C1–C6 alcohols, into methanol or into dimethyl ether, isomerization of hydroisomerization reactions, hydrogenolysis, and in general manner reactions involving breaking of forming a carbon-carbon bond can be mentioned.

For all these reactions, it is necessary to have available a simple method of preparation which allows catalysts having a controlled metallic particle size to be obtained in order to fully optimize catalyst activity.

The conventional preparation processes for supported metallic catalysts consist of depositing a metallic salt or a co-ordination complex on the support, then carrying out an activation stage consisting of thermal treatments carried out under air and/or under hydrogen.

They allow catalysts to be obtained for which the particle sizes are small (less than approximately 1 nm) and for which a significant proportion of the metal (more than 80%) is accessible to the molecules to be converted (J. P. Boitiaux, J. Cosyns, S. Vasudevan, Scientific Bases for the Preparation of Heterogeneous Catalysts, G. Poncelet et al. Editor, pages 123–134, Elsevier, 1983).

Such catalysts can be used in certain reactions (dehydrogenation of paraffins, for example) but do not lead to higher activities for other reactions (hydrogenation of diolefines or acetylenic compounds, for example). For these reactions, it is advantageous to have a supported metallic catalyst for which the metallic particles have a size greater than approximately 1 nm, less than 80% of the metal involved therefore being accessible to the molecules to be converted.

To achieve particle sizes greater than approximately 1 nm by conventional methods, it is usually necessary to treat the catalyst under severe conditions (increase in activation temperature, treatment in the presence of water vapour), which leads to a sintering of the particles, i.e. to their enlargement (J. P. Boitiaux, J. Cosyns, S. Vasudevan, Applied Catalysis, Vol 6, Pages 41 to 51, 1983).

However, with this technique, the enlargement of the particles is not well controlled. The catalysts thus obtained are composed of particles, the size of which can vary within a large range.

These catalysts have a proportion of particles of a size less than the size of the desired particles and the atoms situated at the surface of which are less active in the reaction considered. They also contain particles of larger size having only a low proportion of metallic atoms accessible and thus a low overall activity.

The said conventional preparation processes, i.e. the processes in which a metallic salt or a co-ordination complex is deposited on a support, then subjected to an activation procedure (cf. Z. Karpinski, Adv. Catal., Vol. 37, p. 45, 1990), are thus not satisfactory as they do not allow catalysts having particles of larger size, i.e. greater than approximately 1 nm with a restricted distribution of particle size to be obtained.

In order to improve the activity of the catalysts, it is thus advantageous to have a preparation method available which allows supported metallic catalysts to be obtained the particle size of which is on average greater than approximately 1 nm and having a restricted distribution as regards size.

More fundamental studies on supported metallic catalysts reported in the literature show that the interaction between the metal or metals comprising the catalyst and the support used also affect the activity of the catalyst (cf. Z. Karpinski, Adv. Catal., Vol. 37, p. 45, 1990).

It is generally acknowledged that for reactions, such as for example, hydrogenation reactions, detachment or carbon-carbon bond formation, a strong interaction between the metal and the support leads to a decrease in catalyst activity. This strong interaction between the metal and the support is generally conditional upon the method of preparing the catalyst and, there again, it is necessary to have a preparation method for limiting the interaction between the metal and support.

This interaction between the metal and the support can be characterized by a set of characterization techniques known to a person skilled in the art. For example, programmed thermoreduction which consists of determining the reduction temperature of the supported metal oxide can be mentioned. In fact, it has been shown that the more the reduction temperature of the metal oxide is increased, the more the interaction between the metal and the support is increased.

Another method, more difficult to implement but giving a direct response, is EXAFS. In this method, the identification of the number of neighbouring oxygen atoms around the reduced metal allows comparison of the interaction between the metal and the support for two catalysts having similar metallic particle sizes, but produced by different preparation methods, and thus the quantification of the interaction between the metal and the support.

SUMMARY OF THE INVENTION

The present invention relates to a catalyst which can be used in a process involving conversion reactions for organic compounds, comprising at least one support and at least one metal, and characterized in that it has particles the average size of which is greater than approximately 1 nm, and more than 80% of the particles size of which is comprised in a range D±(D0.2), i.e. comprised between D−(D.0,2) and D+(D.0,2) where D represents the average size of the particles.

A new preparation process for supported metallic catalysts has also been discovered, allowing the size of the particles of the finished catalyst to be better controlled. The process according to the invention consists of preparing a colloidal suspension, in aqueous phase, of the oxide of the metal or metals to be supported, then depositing this suspension on a support, drying the product obtained and optionally reducing the oxide or oxides thus supported.

DETAILED DESCRIPTION OF THE INVENTION

The catalyst according to the invention comprises at least one support, preferably of oxide type, and at least one metal, preferably chosen from the metals of groups 5 to 12, i.e. from the groups 5,6,7,8,9,10,11 and 12 of the new periodic classification (Handbook of Chemistry and Physics, 76$^{th}$ edition, 1995–1996, inside front cover), preferably from the following elements: V, Nb, Ta, Cr, Mo, W, Mn, Re, Fe, Ru, Os, Co, Rh, Ir, Ni, Pd, Pt, Cu, Ag, Au, Zn, Cd, more preferably from the metals of groups 6 to 10 of said classification and very preferably from the following metals: nickel, cobalt, iron, platinum, palladium, molybdenum, tungsten. It is characterized in that it has particles with an average size greater than approximately 1 nm, and more than 80% of the particles the size of which is comprised in a range D±(D.0.2) where D represents the average size of the particles.

Moreover, the interaction between the metal and the support of the catalysts according to the invention is reduced with regard to the catalysts prepared according to conventional methods.

The catalyst according to the invention can also optionally further contain at least one alkali metal, preferably lithium, sodium or potassium, and optionally at least one alkaline-earth metal, preferably magnesium, calcium, strontium or barium.

The metal content of the catalyst according to the invention is generally comprised between 0.01 and 50% by weight, preferably between 0.01 and 35% by weight. It is adapted according to the nature of the metal and the reaction considered.

The alkali and/or alkaline-earth metal content optionally present is generally comprised between 0% and 20% by weight, preferably between 0% and 10% by weight, very preferably between 0.01 and 5% by weight, and yet more particularly preferably between 0.05 and 3% by weight.

The support can be chosen from any of the supports already described in the literature for the type of catalyst and application considered. For example, refractory oxides such as silica, alumina, magnesia, silica-aluminas, alumina silicates, carbons, organic supports, can be mentioned.

The preparation process for the catalysts according to the invention consists in preparing a colloidal suspension, in aqueous phase, of the oxide of the metal or metals to be supported, then in depositing this suspension on a support, in drying the precursor of the catalyst obtained, and optionally in reducing the oxide thus supported by means of any reducing compound, for example, molecular hydrogen.

In the preparation process according to the invention, the colloidal suspension of metallic oxide is prepared in aqueous phase and in the absence of a reducing agent or organic solvent. With regard to other preparation processes for colloidal suspensions, the process according to the invention uses water as a solvent and thus avoids the manipulation of organic solvent as well as the presence of a reducing agent whilst preparing said suspension. This process has an advantage as regards safety and leads to savings in terms of the cost of the process. If required, a calcination and/or a reduction can optionally be carried out after the colloidal suspension has been deposited and the product obtained dried.

The preparation process for catalysts according to the invention thus comprises two stages:
  a) preparation of a colloidal suspension of a metallic oxide in aqueous phase.
  b) deposition of the colloidal suspension prepared in stage a) by impregnation on a support,
  c) drying of the product obtained in stage b), followed optionally by the following stages:
  d) calcination of the product obtained in stage c), preferably under air or nitrogen,
  e) reduction of the product obtained in stage c) or d), preferably using gaseous hydrogen.

In the preparation method according to the invention, the colloidal suspension is obtained by hydrolysis of a metallic cation in an aqueous medium, which leads to the formation of oxide or hydroxide particles in suspension.

According to a preferred procedure, the hydrolysis can be carried out for example by neutralization using a mineral base such as ammonium hydroxide or alkaline hydroxides such as for example soda and potash, of an aqueous solution containing a precursor salt capable of leading to the metallic hydroxide or to the metallic oxide by neutralization.

Salts which can be used in the preparation method according to the invention are for example nitrates, sulphates, chlorides of these metals or any other salt capable of generating a precursor in solution or able to produce hydroxides or oxides which give rise to the formation of particles in suspension.

The solution containing the mineral base can be poured for example into the aqueous solution containing the metallic salt or salts or, inversely, the solution containing the metallic salt or salts can be poured into the solution containing the mineral base. It is also possible to prepare the colloidal suspension by pouring the two solutions simultaneously into the apparatus used to prepare the colloidal suspension.

Whilst preparing the colloidal suspension of oxides, one or more other metallic salts can optionally be introduced at any time during the preparation. These salt or salts can optionally lead to the formation of oxide or hydroxide in an aqueous medium or not be converted in the reaction medium.

Other elements which aim to stabilize the colloidal suspension can also be introduced during the preparation. Among these elements, chlorine, protons, nitrites, ammonium hydroxide can be mentioned, without this list being limitative.

After hydrolysis, it is optionally possible to leave the suspension in a tank under agitation, optionally after adjusting the pH by adding quantities of acid or base compatible with the stability of the colloidal suspension.

While it is desirable to eliminate the alkali or alkaline-earth metals of the catalyst according to the invention, it is possible to add an aqueous solution with adjusted pH to the colloidal suspension. The suspension or precipitate obtained is then filtered and washed with an aqueous solution, then if necessary resuspended in another aqueous solution, the pH and composition of which are controlled in order to obtain a colloidal suspension again. This suspension can then be impregnated. These operations can optionally be carried out continuously.

During the preparation of the colloidal suspension, monitoring of the operating parameters such as pH, time, temperature, duration of maturation, addition of additives, preferably mineral additives, at different times in the preparation, the concentration of the medium, or the ionic strength allows the size of the oxide particles in the medium, their number and their aggregation state to be controlled.

In general, the temperature of the preparation is comprised between −10° C. and 100° C., preferably between 0° C. and 50° C. and very preferably between 0° C. and 35° C. The duration of maturation can generally vary between 0 and 40 hours, preferably between 15 minutes and 24 hours, and the ionic strength is preferably comprised between 0.005 and 20 moles per liter, more preferably between 0.01 and 10 moles per liter.

The suspension containing the metal or metals in the form of oxide or hydroxide particles is then impregnated on a support, chosen preferably from refractory oxides such as silica, alumina, magnesia, silica-aluminas, alumina silicates, carbons, organic supports.

The support can optionally be subjected to a set of treatments before the impregnation stage, such as calcinations or hydrations. The support can also already contain one or more metallic elements before impregnation of the colloidal suspension. It is also possible to introduce these metallic elements into the colloidal suspension. These metallic elements can be introduced either by conventional techniques or by using the process according to the present invention.

The impregnation is preferably carried out under conditions where the volume of the solution corresponds approximately to the pore volume of the support. Preferably, the colloidal suspension is poured onto the support. This process can be carried out either in a discontinuous manner, i.e. the preparation stage of the colloidal suspension precedes the impregnation stage onto the support and the essential part of the colloidal suspension is sent to the impregnation stage in one go, or continuously, i.e. the product obtained in the first stage is sent to the second stage immediately.

A process where hydrolysis is carried out by neutralization using a mineral base of a solution containing a metallic salt can be described as an example of a continuous process. The two solutions are poured simultaneously into a tank which, when full, overflows into an area containing the catalyst support which is to be impregnated.

After impregnation, the catalyst is preferably dried in order to eliminate all or part of the water introduced during impregnation, preferably at a temperature lower than approximately 250° C., more preferably between 80° C. and 200° C. After drying, the catalyst can optionally be calcined, preferably under air or under nitrogen, at a temperature comprised between approximately 250° C. and approximately 900° C., preferably comprised between approximately 300° C. and approximately 500° C.

The catalyst is then optionally reduced. This stage is preferably carried out in the presence of gaseous hydrogen and either in-situ, i.e. in the reactor in which the catalytic conversion is carried out, or ex-situ, i.e. in a different item of equipment from that where the catalytic reaction takes place.

The supported metallic catalysts according to the invention thus obtained have particles of an average size greater than approximately 1 nm, and more than 80% of the particles, the size of which is comprised in the range $D \pm (D.0.2)$ where D represents the average size of the particles.

The catalyst according to the invention can be used in a process involving any conversion reaction for organic compounds. However, these catalysts are particularly well suited to the reactions for which the activity of the metallic atoms situated at the surface of the particles is dependent on the size of these particles, i.e. structure-sensitive reactions.

Among these reactions, hydrogenation reactions of compounds having acetylenic, dienic, olefinic, aromatic, ketone, aldehyde, acid or nitro functions, hydrogenation of carbon monoxide into C1–C6 alcohols, into methanol or into dimethyl ether, isomerisation or hydro-isomerisation reactions, hydrogenolysis, and in general, reactions involving breaking or forming a carbon-carbon bond can be mentioned.

The operating conditions usually used for these reactions are the following: a temperature comprised between 0° C. and 500° C., preferably between 25 and 350° C., a pressure comprised between 0.1 and 20 MPa, preferably between 0.1 and 10 MPa a hourly space velocity (H.S.V.) (by volume) comprised between 0.1 and 50 $h^{-1}$, preferably between 1 and 20 $h^{-1}$, for a liquid feed; and between 500 and 30,000 $h^{-1}$, preferably between 500 and 15,000 $h^{-1}$ for a gaseous feed. When hydrogen is present, the molar ratio of hydrogen to feed is comprised between 1 and 500 liters per liter, preferably between 10 and 150 liters per liter.

The user must adapt the implementation of the catalyst according to the invention and the operating conditions to the reaction and to the technology used. The catalyst can be used either in a fixed-bed reactor operating in gaseous phase or in the presence of at least one liquid phase such as a trickle-bed reactor, or in a reactor in which the catalyst is in suspension in a liquid phase (slurry reactor).

The following examples illustrate the invention without limiting its scope.

EXAMPLE 1

According to the Invention

Pd-based Monometallic Catalyst

Catalyst A is prepared by impregnating a colloidal suspension of palladium oxide on an alumina of 70 $m^2/g$. The colloidal suspension is obtained by adding normal soda to a solution of palladium nitrate to obtain a pH of 2. The volume of the solution used is 0.6 ml/g alumina. After the addition of the soda solution, sodium nitrite is added with a stoichiometry (molar ratio) $NO_2^-$/palladium of 1. The suspension is then poured onto the alumina beads which are then dried at 120° C. for 12 hours, calcined for two hours at 450° C. under an air flow with a flow rate equal to 1 liter per gram of catalyst and per hour (lgcata.h). The catalyst is finally reduced under a hydrogen flow for 2 hours at 200° C.

The catalyst thus obtained contains 0.3% by weight of palladium and has palladium particles of an average size of 2 nm observed under transmission electron microscopy with a very restricted size distribution, 90% of the particles having a size comprised between 1.6 nm and 2.4 nm.

EXAMPLE 2

Comparative

Catalyst B is prepared under the conditions of Example 1 but using a solution of palladium nitrate with pH=0.8. The solution is directly impregnated on an alumina with a specific surface area equal to 70 m$^2$/g. After drying at 120° C. and calcination at 450° C. under air (2 hours), the catalyst is reduced under hydrogen at 200° C. for 2 hours.

Catalyst B has palladium particles, observed under transmission electron microscopy, which have an average size of 3.5 nm, only 60% of the particles having a size comprised between 2.8 nm and 4.2 nm.

EXAMPLE 3

According to the Invention

Ni-based Monometallic Catalyst

Catalyst C is prepared by impregnating a colloidal suspension of Ni oxide on an alumina of 139 m$^2$/g. This suspension is prepared by adding 9.2 cm$^3$ of 5 N soda to a solution of nickel nitrate at 150 g of Ni/l. The pH before impregnation is 6.5. 5 ml of water are then added in order to obtain a volume of solution of 1.05 ml/g alumina. The catalyst is then dried at 120° C. for 2 hours and calcined at 400° C. for 2 hours also.

The final catalyst contains 8% by weight of Ni and the average size of the particles determined by the chemisorption of oxygen and by electron microscopy is 1.2 nm, with 87% of particles which have a size comprised between 0.95 and 1.45 nm. Moreover, the distribution of the metal inside the alumina beads is perfectly homogeneous.

EXAMPLE 4

Comparative

Catalyst D is prepared by impregnating a solution of nickel nitrate of initial pH equal to 3.2 on the same support as in Example 3. After drying at 120° C. and calcination at 400° C. under air (2 hours), the catalyst is reduced under hydrogen at 400° C.

The catalyst contains 8% by weight of nickel, and the average size of the particles is 8.5 nm with 65% of particles having a size comprised between 6.5 and 10.5 nm.

EXAMPLE 5

According to the Invention

Bimetallic Pd—Sn Catalyst

Catalyst E is prepared by impregnating a colloidal suspension containing palladium and tin. This solution is prepared by adding 0.5 g of SnCl$_2$, 2H$_2$O, and then 20 ml of an acidic solution containing palladium nitrate at pH=0.8 to a soda solution at pH=14. The final catalyst contains 0.5% by weight of tin and 0.3% by weight of palladium.

Analysis by electron microscopy shows an average particle size of 1.5 nm, with 88% of particles having a size comprised between 1.2 and 1.8 nm.

EXAMPLE 6

Comparative

Bimetallic Pd—Sn Catalyst

Catalyst F is prepared by impregnating a solution of palladium nitrate at pH=0.8 on an alumina of specific surface area of 70 m$^2$/g. After drying at 120° C. and calcination at 450° C. under air for 2 hours, a solution of stannic choride at pH=0.2 is impregnated. The catalyst is then dried at 120° C. and calcined at 450° C. for 2 hours.

Catalyst F obtained contains 0.3% by weight of palladium and 0.5% by weight of tin. It has an average particle size equal to 4 nm and 55% of particles have a size comprised between 3.2 and 4.8 nm.

EXAMPLE 7

Evaluation of Catalytic Properties

The different catalysts prepared in Examples 1 to 4 are subjected to a hydrogenation test of a diolefinic compound perfectly agitated in a discontinuous reactor without recirculation. The operating conditions are as follows:

mass of catalyst: 2g hydrogen pressure: 10 bar (palladium catalyst), 20 bar (nickel catalyst)

temperature: 17° C. (palladium catalyst) 20° C. (nickel catalyst)

volume of butadiene: 12 ml volume of n-heptane: 180 ml.

Analysis of the products of the reaction allow the activity of the catalysts under the above-mentioned experimental conditions to be determined and thus the different preparations to be classified. The results are shown below and give the values of the hydrogenating activity expressed in moles of converted butadiene per minute and per gram of metal deposited on the catalyst. The 1-butene selectivity given by the ratio 1-butene/sum of butenes at a butadiene conversion rate of 80%, as well as the ratio of hydrogenation constants of butadiene and butene (K1/K2) are also shown.

|  | Activity mole · min$^{-1}$ · g$^{-1}$ metal | 1-Butene selectivity % | K1/K2* |
| --- | --- | --- | --- |
| Catalyst A | 5.6 | 59 | 1.5 |
| Catalyst B | 4.3 | 59 | 1.1 |
| Catalyst C | 0.19 | 66 | 1.0 |
| Catalyst D | 0.09 | 66 | 0.9 |
| Catalyst E | 0.6 | 60 | 12.0 |
| Catalyst F | 4 | 60 | 1.2 |

K1/K2: ratio of hydrogenation kinetic constants for butadiene and 1-butene

These results show that the preparation method according to the invention allows an increase in performance to be obtained with regard to the conventional methods of preparation:

- for the palladium or nickel based monometallic catalysts, the catalytic activity is multiplied by a factor of 1.3 to 2 (comparison A/B and C/D respectively);
- in the case of the palladium-tin bimetallic catalyst, the kinetic of hydrogenation of 1-butene is very significantly reduced with regard to that of a bimetallic catalyst prepared according to a conventional method (comparison E/F), butadiene is thus hydrogenated much more rapidly.

EXAMPLE 8

According to the Invention

Platinum Based Monometallic Catalyst

Catalyst G is prepared by impregnating a colloidal suspension of platinum on a δ-alumina support having a specific area of 130 m$^2$/g. The support is in the form of spheres having a diameter comprised between 1.4 and 2.8 mm, and a pore volume of 1.05 ml/g.

The colloidal suspension is obtained by adding 8.36 cm$^3$ of a 1N soda solution to 10 cm$^3$ of a hexachloroplatinic acid solution (H$_2$Pt(OH)$_6$) at 4.6 g/l of Platinum, to obtain a pH of 1.07.

The catalyst is dried at 120° C. during 2 hours, and then calcined at 200° C. during 2 hours. After reduction under a hydrogen flux at 250° C., the average size of platinum particles, determined by H$_2$—O$_2$, titration is found to be 3.5 nm. Electron microscopy analysis shows that more than 80% of the particles have a size comprised between 2.8 and 4.1 nm.

What is claimed is:

1. A catalyst comprising at least one support and metallic particles of average size greater than approximately 1 nm, and more than 80% of said metallic particles have a particle size within a range of D±(0.2×D) where D represents the average size of said metallic particles, and further comprising at least one further metal which is an alkali metal or an alkaline-earth metal, wherein the alkali or alkaline-earth metal content is no more than 20% by weight.

2. A catalyst according to claim 1 in which the metal is chosen from the metals of groups 5 to 12 of the new periodic classification.

3. A catalyst according to claim 1 in which the metal is nickel, cobalt, iron, platinum, palladium, molybdenum or tungsten.

4. A catalyst according to claim 1 further comprising at least one alkaline-earth metal.

5. A catalyst according to claim 4 in which the alkaline-earth metal content is comprised between 0.01 and 5% by weight.

6. A process for preparing a catalyst according to claim 1, comprising the following stages:
   a) preparation of a colloidal suspension of a metallic oxide in aqueous phase,
   b) deposition of the colloidal suspension prepared in stage a) by impregnation on a support,
   c) drying of the product obtained in stage b).

7. A preparation process according to claim 6 further comprising, after stage c), at least one stage d) of calcination of the product obtained in stage c).

8. A preparation process according to claim 7, further comprising after one of stages c) or d), at least one stage e) of reduction of the product obtained in stage c) or d).

9. A process according to claim 6 in which the preparation temperature is comprised between −10° C. and 100° C., a duration of maturation between 0 and 40 hours, and an ionic strength between 0.005 and 20 moles per liter.

10. A catalyst comprising at least one support and metallic particles of average size greater than 1 nm, and more than 80% of said metallic particles have a size in a range 0.8D to 1.2D where D represents the average size of said metallic particles, and further comprising at least one further metal which is an alkali metal or an alkaline-earth metal, wherein the alkali or alkaline-earth metal content is comprised 0%–20% by weight.

11. A catalyst according to claim 10, which comprises metallic particles of average size of from 1 to 10 nm.

12. A catalyst according to claim 10, which comprises metallic particles of average size of from 1 to 8 nm.

13. A catalyst according to claim 10, which comprises metallic particles of average size of from 1 to 5 nm.

14. A catalyst according to claim 10, which comprises metallic particles of average size of from 1 to 4 nm.

15. A catalyst according to claim 10, which comprises metallic particles of average size of from 1 to 3.5 nm.

* * * * *